United States Patent
Benfold et al.

(10) Patent No.: US 12,529,800 B2
(45) Date of Patent: Jan. 20, 2026

(54) LOCATION MEASUREMENT ERROR DETECTION

(71) Applicant: Niantic Spatial, Inc., San Francisco, CA (US)

(72) Inventors: Ben Benfold, Oxford (GB); Pierre Fite-Georgel, San Rafael, CA (US)

(73) Assignee: Niantic Spatial, Inc., San Francisco, CA (US)

( * ) Notice: Subject to any disclaimer, the term of this patent is extended or adjusted under 35 U.S.C. 154(b) by 9 days.

(21) Appl. No.: 18/523,792

(22) Filed: Nov. 29, 2023

(65) Prior Publication Data

US 2025/0067562 A1   Feb. 27, 2025

Related U.S. Application Data

(60) Provisional application No. 63/578,122, filed on Aug. 22, 2023.

(51) Int. Cl.
*G01S 19/00* (2010.01)
*A63F 13/00* (2014.01)
(Continued)

(52) U.S. Cl.
CPC ........ *G01S 19/396* (2019.08); *G01C 21/1656* (2020.08); *G01C 21/18* (2013.01);
(Continued)

(58) Field of Classification Search
CPC ... G01S 19/396; G01S 19/40; G01C 21/1656; G01C 21/18; A63F 13/216; A63F 13/35
(Continued)

(56) References Cited

U.S. PATENT DOCUMENTS

| | | |
|---|---|---|
| 9,689,686 B1 | 6/2017 | Carmack et al. |
| 2013/0282275 A1 | 10/2013 | Park et al. |

(Continued)

FOREIGN PATENT DOCUMENTS

| | | |
|---|---|---|
| KR | 10-2012-0080489 A | 7/2012 |
| KR | 10-2023-0091608 A | 6/2023 |

OTHER PUBLICATIONS

International Search Report and Written Opinion received for PCT Patent Application No. PCT/IB2024/058186, mailed on Dec. 6, 2024, 8 pages.

*Primary Examiner* — Tiffany P Young
(74) *Attorney, Agent, or Firm* — Fenwick & West LLP

(57) ABSTRACT

A system determines an accuracy of a set containing a plurality of sensor location measurements of a client device and generating a set of sensor location measurements labeled with an associated accuracy estimate, is presented. The system receives a plurality of sensor location measurements of the client device generated by a location sensor. The system may determine the accuracy of a sensor location measurement by comparing the sensor location measurement to a reference location measurement, such as VIO location measurements computed using VIO data. The system computes a first set of location translations for the set of sensor location measurements and a second set of location translations for the set of VIO location measurements. The system may calculate a measurement difference between each corresponding pair of location translations from the first and second set, identify measurement differences that exceed a threshold, and label the corresponding sensor location measurement as inaccurate.

18 Claims, 6 Drawing Sheets

(51) Int. Cl.
*G01C 21/00* (2006.01)
*G01C 21/16* (2006.01)
*G01C 21/18* (2006.01)
*G01S 19/39* (2010.01)
*G01S 19/40* (2010.01)
*A63F 13/216* (2014.01)
*A63F 13/35* (2014.01)

(52) U.S. Cl.
CPC ............ *G01S 19/40* (2013.01); *A63F 13/216* (2014.09); *A63F 13/35* (2014.09)

(58) Field of Classification Search
USPC ........................................................ 701/501
See application file for complete search history.

(56) References Cited

U.S. PATENT DOCUMENTS

| | | |
|---|---|---|
| 2017/0219716 A1 | 8/2017 | Niesen et al. |
| 2018/0188382 A1 | 7/2018 | Jose et al. |
| 2019/0317221 A1* | 10/2019 | Molina-Markham ........................ G01S 19/215 |
| 2020/0348422 A1* | 11/2020 | Carcanague ............ G01S 19/44 |
| 2021/0325544 A1* | 10/2021 | Bageshwar ............. G01S 19/52 |

* cited by examiner

LOCATION MEASUREMENT ERROR DETECTION

CROSS-REFERENCE TO RELATED APPLICATIONS

This application claims the benefit of U.S. Provisional Application No. 63/578,122, filed on Aug. 22, 2023, which is hereby incorporated by reference in its entirety.

TECHNICAL FIELD

This disclosure relates generally to device localization, and more specifically to determining an accuracy of location measurements.

BACKGROUND

Augmented reality (AR) technology has been rapidly advancing in recent years, with widespread adoption across various industries. In AR applications, a system may track the location and orientation (collectively "pose") of a user device in the physical world to provide services to the user. The system may overlay virtual elements on the depiction of the real-world environment. Specifically, the system may display a virtual element over a video feed captured by the user device and displayed to the user such that the virtual element appears to be located within the physical world. The system may use the device's pose to correctly display the virtual element. However, AR applications face a challenge with the accuracy of tracking the device's pose as the device moves around a geographic area. For example, as global navigation satellite system (GNSS) measurements are often inaccurate or incorrect due to environmental factors, it is challenging to determine an accurate pose of a device using said GNSS measurements. Environmental factors can include tall buildings or other structures which can reflect or block GNSS satellite signals and can introduce multipath interference. As such, a device that is located indoors or is surrounded by buildings may suffer from degraded GNSS measurement accuracy, which negatively impacts the accuracy of pose estimation.

SUMMARY

A system, such as a game server or a client device, compares sensor location measurements to visual inertial odometry (VIO) measurements to confirm the accuracy of the sensor location measurement. A sensor location measurement is a measurement captured by a location sensor of a client device. For example, the sensor location measurement may be a GNSS measurement captured by a GNSS sensor on the client device. The client device captures a set of sensor location measurements and generates translations between these measurements. These translations represent the changes between sequential pairs of location measurements. For example, the translations may be vectors representing the change from a location of a first measurement to a second measurement.

The client device also captures VIO location measurements and similarly generates translations between the VIO measurements. The client device identifies the VIO location translation that corresponds to each sensor location translation and computes a difference between them to determine whether they are different enough that the sensor location measurements are likely to be inaccurate. For example, if the difference between the sensor location translation and the VIO location translation exceeds some threshold value, the client device may label the sensor location measurements corresponding to the sensor location translation as inaccurate. If the client device identifies inaccurate sensor location measurements, the client device may perform certain remedial actions, such as disabling certain location-based features of a client application operating on the client device or notifying a user of the client device.

A system, such as a game server or a client device, identifies satellite signals that are inaccurate so that other satellite signals from that satellite may not be used to locate a client device. For example, a client device may receive a set of satellite signals from a set of satellites and generate subsets from that set that each exclude one of the satellite signals. The client device generates sensor location measurements for each of the subsets and generates an accuracy score for each of these measurements. The client device then identifies a sensor signal that is inaccurate based on the accuracy scores for the subsets. For example, the client device may identify a subset with an accuracy score that indicates that the corresponding sensor location measurement is accurate and thereby determine that the satellite signal that was excluded from that subset was inaccurate.

Comparing sensor location measurements to VIO location measurements allows for more effective identification of when a location sensor is capturing inaccurate measurements. VIO systems tend to be very effective at measuring a movement of a device, though they generally cannot provide an absolute location of the device. Instead, VIO systems tend to generate measurements that show the device's location relative to some point (e.g., some starting point). In contrast, sensor location measurements, such as GNSS measurements, can provide the absolute location of a device on Earth, but if the sensor location measurements are inaccurate, those inaccuracies tend to be independent of each other between each measurement. Thus, by identifying discrepancies between the movement of a client device as determined by a VIO system versus a location sensor, the client device can more effectively identify inaccuracies in measurements by the location sensor.

Furthermore, by identifying satellites that are providing signals that are inaccurate (e.g., because the signals are bouncing off of nearby landmarks, such as buildings), the client device can account for the inaccurate signals when using a set of satellite signals to determine its location. Therefore, the client device can be more effective at localizing itself and provide more accurate location-based services to users.

The figures depict various embodiments for purpose of illustration only. One skilled in the art will readily recognize from the following discussion that alternative embodiments of the structures and methods illustrated herein may be employed without departing from the principles described herein.

DETAILED DESCRIPTION

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where magnetic field measurements are desirable. For example, the method described herein may be implemented in a location-based application that displays virtual navigation instructions or text labels that relate to real-world information. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

System Overview

Figure 1:
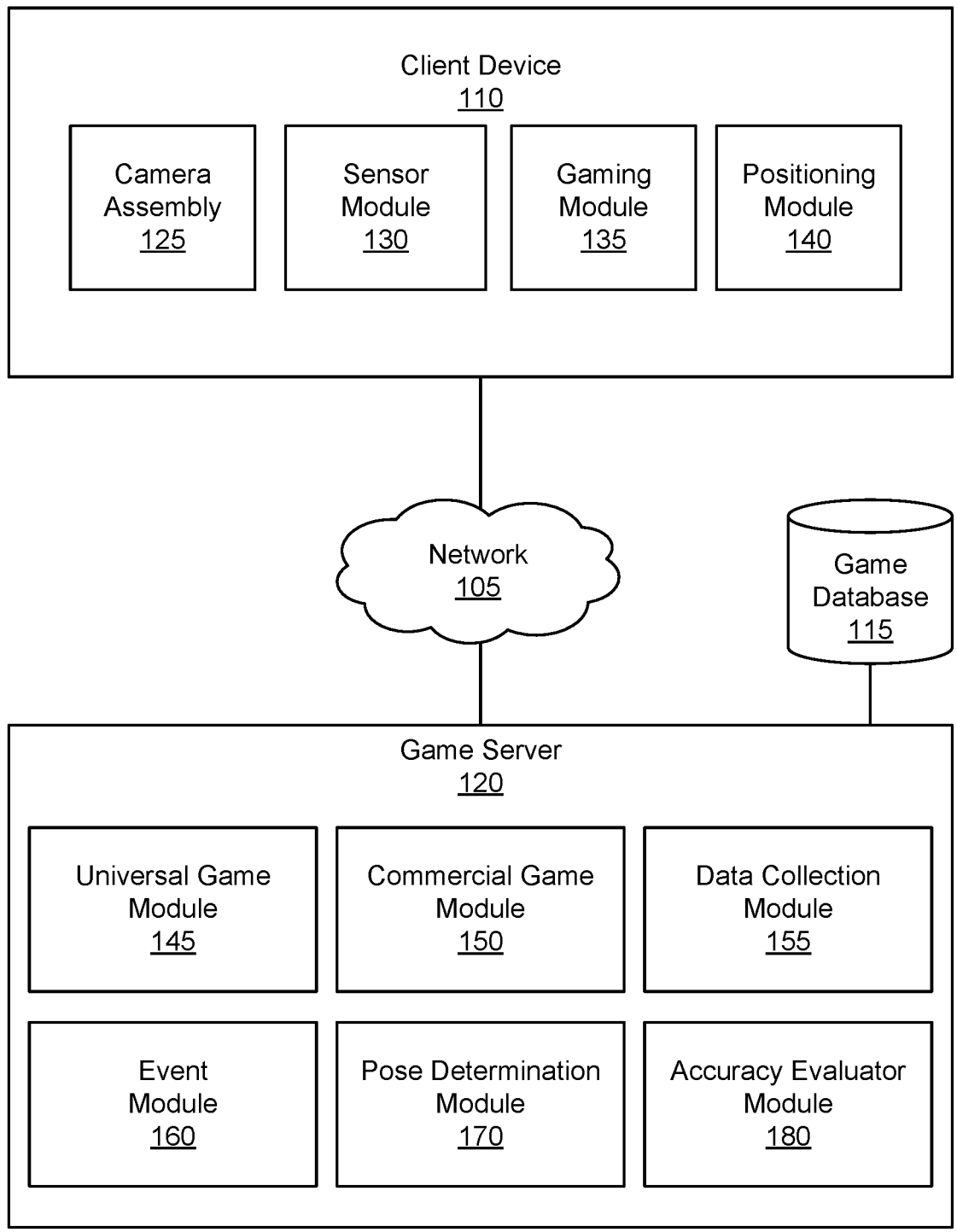
FIG. 1 illustrates a networked computing environment 100, in accordance with some embodiments.

Figure (FIG. 1 illustrates a networked computing environment 100, in accordance with some embodiments. Although FIG. 1 depicts a parallel reality gaming environment as an example, but the describe methods/systems may be used in other contexts. In practice, and as recognized by those of ordinary skill in the art, a networked computing environment may have additional, less, or variations of the components provided in FIG. 1. Also, while each of the components in the networked computing environment 100 is described in a singular form, the networked computing environment 100 may include one or more of each of the components. Additionally, functionality of each of the components may be divided up differently from the description below. For example, a client device may determine the accuracy of a sensor location measurement of a client device locally or by transmitting measurements to a remote server (e.g., game server 120) to determine the accuracy of the sensor location measurement.

The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

The networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of client devices 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GNSS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. In the embodiment shown in FIG. 1, each client device 110 includes a sensor module 130, and software components such as a gaming module 135 and a positioning module 140. The client device 110 may include various other input/output devices for receiving information from and/or providing information to a player. Example input/output devices include a display screen, a touch screen, a touch pad, data entry keys, speakers, and a microphone suitable for voice recognition. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment in which the client device 110 is located. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. Additionally, the orientation of the camera assembly 125 could be parallel to the ground with the camera assembly 125 aimed at the horizon. The camera assembly 125 captures image data and shares the image data with the computing device on the client device 110. The image data can be appended with metadata describing other details of the image data including sensory data (e.g., temperature, brightness of environment) or capture data (e.g., exposure, warmth, shutter speed, focal length, capture time, etc.). The camera assembly 125 can include one or more cameras which can capture image data. In one instance, the camera assembly 125 comprises one camera and is configured to capture monocular image data. In another instance, the camera assembly 125 comprises two cameras and is configured to capture stereoscopic image data. In various other implementations, the camera assembly 125 comprises a plurality of cameras each configured to capture image data.

The client device 110 includes a sensor module 130 that may include various sensors for recording data from the client device 110. The various sensors including, but not limited to, location sensors, movement sensors, accelerometers, gyroscopes, other inertial measurement units (IMUs), barometers, positioning systems, thermometers, light sensors, depth sensors, etc. A location sensor is a sensor that generates sensor location measurements describing the location of the client device 110. For example, each sensor location measurement may include a longitude, latitude or altitude of the client device 110, and also may include a timestamp describing when the sensor location measurement was captured.

The location sensor may be a global navigation satellite system (GNSS) sensor that uses signals from satellites to estimate the position of the client device 110. The GNSS sensor receives satellite signals transmitted by GNSS satellites which orbit the Earth. The GNSS sensor includes an antenna to capture the satellite signals which may carry information associated with the satellite's identity, ephemeris data (e.g., satellite orbit, clock information), and timing data. In some embodiments, the positioning module 140 receives the satellite signals from the location sensor to extract the necessary information from the satellite signals to compute sensor location measurements of the client device 110, e.g., GNSS coordinates of the client device 110. The positioning module may calculate the location of the client device 110 using methods including, and is not limited to, trilateration, multilateration, phase-difference of arrival (PDOA), time-difference of arrival (TDOA), or any suitable combination thereof.

The client device may use images captured by the camera assembly 125 and data captured from the sensor module 130 as visual inertial odometry (VIO) data to determine the client device's pose. For example, the client device 110 may send the VIO data to the pose determination module 170 to generate localization information such as a pose of the client device 110, e.g., the orientation of the client device 110.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including, for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g., renders imagery of the virtual world) associated with the game and allows a user to interact in the virtual world to perform various game objectives. In some embodiments, the gaming module 135 presents image data from the real world (e.g., captured by the camera assembly 125) augmented with virtual elements from the parallel reality game. In these embodiments, the gaming module 135 may generate virtual content and/or adjust virtual content according to other information received from other components of the client device 110. For example, the gaming module 135 may adjust a virtual object to be displayed on the user interface according to a depth map of the scene captured in the image data. In other embodiments, the gaming module 135 generates virtual objects for display on a semi-transparent display through which the user views the real world (e.g., an AR headset, AR glasses, etc.). Thus, the virtual objects may be overlaid on the user's view of the real world.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate and/or adjust game content to be displayed by the client device 110. For example, the gaming module 135 may generate a virtual element based on depth information. In another example, the gaming module 135 may update a virtual element based on a pose of the camera assembly.

In one embodiment, the client device 110 may determine a coarse position of the client device 110. The client device 110 includes a positioning module 140 comprising any device or circuitry for monitoring the position of the client device 110. For example, the positioning module 140 can determine actual or relative position by using a satellite navigation positioning system (e.g. Global Navigation Satellite System (GNSS) including GPS, Galileo positioning system, Global Navigation satellite system (GLONASS), BeiDou Satellite Navigation and Positioning system, etc.), an inertial navigation system, a dead reckoning system, based on IP address, by using triangulation and/or proximity to cellular towers or Wi-Fi hotspots, and/or other suitable techniques for determining position. As described above, the positioning module 140 receives location data from a location sensor (e.g., GNSS sensor) to generate a plurality of sensor location measurements of the client device 110. The positioning module 140 may receive location data from various other sensors of the sensor module 130 that may aid in accurately positioning the location of the client device 110. While the positioning module 140 may be used to determine a course position of the client device 110, relocalization of the client device 110 (e.g., to determine the device's fine-grain location and orientation) is performed by the pose determination module 170 on the game server 120, as discussed below. For example, the coarse location (e.g., the GNSS coordinates) identified by the positioning module 140 may be used to identify a three-dimensional (3D) model of the environment in which the client device 110 is located, and the pose determination module 170 localizes against the retrieved model using images captured by the camera assembly 125.

In embodiments in which a coarse position of the client device is determined client-side, the positioning module 140 tracks the position of the player as the player moves around with the client device 110 in the real world and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g., to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 110 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the environment 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g., player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the game server 120 includes a universal gaming module 145, a commercial game module 150, a data collection module 155, an event module 160, a pose determination module 170, and a calibration module 180. As mentioned above, the game server 120 interacts with a game database 115 that may be part of the game server 120 or accessed remotely (e.g., the game database 115 may be a distributed database accessed via the network 105). In other embodiments, the game server 120 contains different and/or additional elements. In addition, the functions may be distributed among the elements in a different manner than described. For instance, the game database 115 can be integrated into the game server 120. Additionally, while the pose determination module 170 and the calibration module 180 are described as located on the game server 120, in other embodiments, pose determination and/or magnetic sensor calibration is performed at the client device 110, as discussed above.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve and/or store game data when hosting the parallel reality game. The universal game module 145 also receives game data from client device 110 (e.g., depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The pose determination module 170 receives VIO data from the client device 110 to estimate a pose of the client device 110 with respect to a reference frame. The VIO data may include images captured by the camera assembly 125 and sensor data from the sensor module 130. In some embodiments, the pose determination module 170 uses a computer vision algorithm, such as a VIO algorithm, to estimate the pose of the one or more cameras of the camera assembly 125. The pose determination module 170 applies the VIO algorithm to the VIO data to detect visual features across multiple image frames to determine the movement of the camera, and the relative location and orientation of the camera with respect to the reference frame. The pose determination module 170 also may process the sensor data to estimate the orientation, acceleration, and rotation of the client device. The VIO determination module 170 thereby uses these results to determine an estimated pose of the client device with respect to the reference frame. The pose determination module 170 may use a filter-based algorithm, an optimization-based algorithm, or a deep learning-based algorithm to determine the pose of the client device. Some examples of VIO algorithms that the pose determination module 170 may use include Simultaneous Localization and Mapping with ORB features (ORB-SLAM), Visual-Inertial Navigation System using Monocular camera (VINS-Mono), and Multi-State Constraint Kalman Filter (MSCKF).

The pose determination module 170 determines the pose of client devices from one or more images captured by the client devices relative to one or more existing images of the physical environment around the client device 110. In one embodiment, the pose determination module 170 uses GNSS coordinates (e.g., received from the positioning module 140 on the client device 110) to retrieve a 3D model of the environment in which the client device 110 is located. The 3D model may be a point cloud or mesh topology generated from previously captured images of the environment. The pose determination module 170 then compares the one or more images captured by the camera assembly 125 to the retrieved 3D model to generate the pose estimate of the client device 110. In some embodiments, the pose determination module 170 uses a 3D model from a visual positioning system (VPS) to determine the pose of the client device.

The accuracy evaluator module 180 determines the accuracy of sensor location measurements of the client device 110 and generates an accuracy label that indicates whether each measurement is accurate. For example, the accuracy evaluator module 180 may receive a plurality of sensor location measurements from the client device 110 and compare each sensor location measurements to a set of a plurality of reference location measurements. In some embodiments, the reference location measurements may include VIO location measurements determined using VIO data from the client device. Each VIO location measurement may include a latitude measurement, longitude measurement, or altitude measurement describing the client device's location, and timestamp describing when the VIO location measurement was generated. The accuracy evaluation process using VIO location measurements is further described in FIG. 4.

The accuracy evaluator module 180 may compare the sensor location measurements to geospatial data from one or more geospatial databases to determine whether the sensor location measurements are accurate. A geospatial database is a database containing geospatial data, which is data that describes locations on the Earth's surface and which may be used to create maps. For example, a geospatial database may include geospatial data describing geographical, geological, or meteorological features of locations on the Earth's surface, such as terrain, altitude, weather roads, railways, buildings, or bodies of water. In some embodiments, the geospatial database may be managed by a third-party, such as a private sector organization or a public sector agency. The accuracy evaluator module 180 may access the geospatial data from one or more geospatial databases through various methods. For example, the accuracy evaluator module may access the data through an application programming interface (API), or direct database access, or may be exported onto a locally managed database.

Where a sensor location measurement include measurements that indicate an location of the client device on the Earth's surface (e.g., longitude and latitude), the accuracy evaluator module 180 may compare other measured values in the sensor location measurements to the corresponding values for that location in the geospatial database to determine whether the sensor location measurement, as a whole, is accurate. For example, as noted above, a sensor location measurement may include the longitude, latitude, and altitude of the client device. The accuracy evaluator module 180 may compare the altitude in the sensor location measurement at that longitude and latitude with the altitude that is listed in the geospatial database. If the difference between the altitudes is exceeds some threshold value, the accuracy evaluator module 180 determines that the sensor location measurement is inaccurate. The accuracy evaluator module 180 may use altitude data stored in a geospatial database (e.g., Digital Elevation Map (DEM) generated from LIDAR surveys) or map data obtained from an open-source online platform, such as Open Street Map (OSM).

The network 105 can be any type of communications network, such as a local area network (e.g., intranet), wide area network (e.g., Internet), or some combination thereof. The network can also include a direct connection between a client device 110 and the game server 120. In general, communication between the game server 120 and a client device 110 can be carried via a network interface using any type of wired and/or wireless connection, using a variety of communication protocols (e.g., TCP/IP, HTTP, SMTP, FTP), encodings or formats (e.g., HTML, XML, JSON), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

According to aspects of the present disclosure, a player can interact with the parallel reality game by simply carrying a client device 110 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, a user interface can include a plurality of non-visual elements that allow a user to interact with the game. For instance, the game interface can provide audible notifications to the player when the player is approaching a virtual element or object in the game or when an important event happens in the parallel reality game. A player can control these audible notifications with an audio control. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Figure 2:
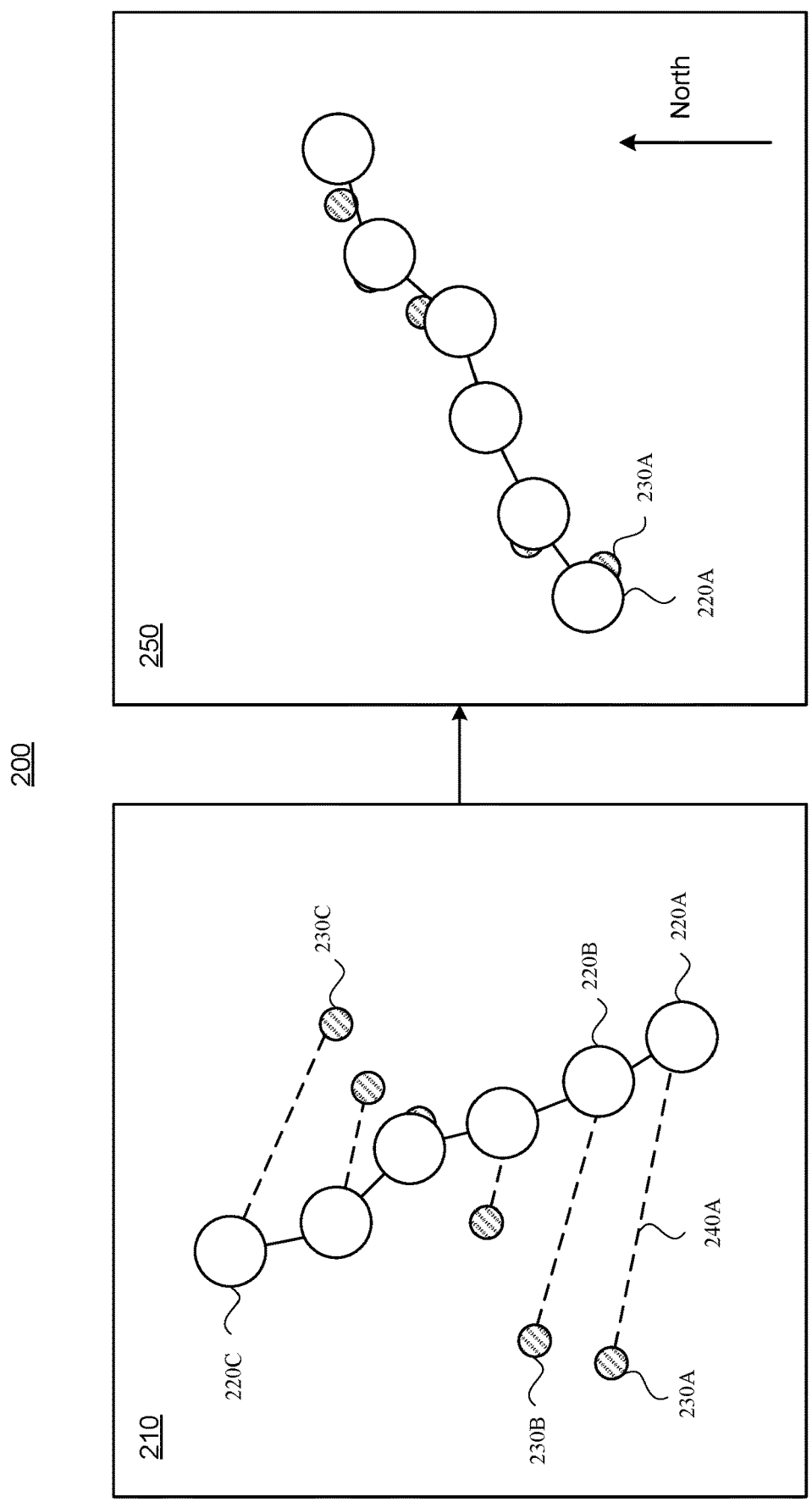
FIG. 2 is a conceptual diagram illustrating a process of determining an accurate geographic orientation of a client device with respect to a reference frame, in accordance with some embodiments.

FIG. 2 is a conceptual diagram illustrating a process of determining an accurate geographic orientation of a client device with respect to a reference frame, in accordance with some embodiments. As a client device moves in a path within a geographic area over a duration of time, the client device generates a plurality of sensor location measurements and VIO data corresponding to the path taken by the client device. The sensor location measurements may be generated by the positioning module 140. As described in FIG. 1, the positioning module 140 may be configured to determine an actual or relative position of a client device by using a navigation positioning system. The VIO data may include images collected from the camera assembly and data collected from the sensor module 140 (e.g., IMU, accelerometer, gyroscope). The VIO data may be provided to the pose determination module 170 to determine a plurality of VIO location measurements of the client device with respect to a reference frame. In the example illustrated by FIG. 2, the sequence of sensor location measurements 230A, 230B, 230C (collectively referred to as 230) and the corresponding VIO location measurements 220A, 220B, 220C (collectively referred to as 220) are collected as the client device travels in a North-East direction.

The system may jointly optimize over a sequence of sensor location measurements 230 to determine a geographic orientation of the client device with respect to a reference frame. In contrast to using a magnetometer, determining the orientation of the client device is not compromised by poor calibration and interference from magnetized buildings and other structures. For example, referring to FIG. 2, the local coordinate system of the client device is not aligned with the global coordinate system. As such, the plurality of sensor location measurements 230 and VIO location measurements 220 are not aligned, with each of the sensor location measurement 230A and the corresponding VIO location measurement 220A having a large difference 240A. To determine an accurate orientation of the client device, the system may determine a transform between a local coordinate system used by the client device and a global coordinate system (e.g., Geographic Coordinate System) based on the plurality of sensor location measurements 230 and VIO location measurements 220. The system may use the determined transform to align the axes of the local coordinate system and the global coordinate system (illustrated by 250), and to convert points and vectors between the two coordinate systems. To increase the accuracy of the transform, the system may filter out inaccurate sensor location measurements and only consider accurate sensor location measurements. The accuracy evaluator module 180 may be configured to determine the accuracy of sensor location measurements and classify locations measurements according to accuracy.

The sensor location measurements and corresponding VIO location measurements may be measured in predefined time intervals. As such, each sensor location measurement and a corresponding VIO location measurement may be associated with a specific time. In some embodiments, the VIO location measurements 230 may be determined using VIO data captured on the client device 110.

Example Process for Identifying Inaccurate Sensor Location Measurements

Figure 3:
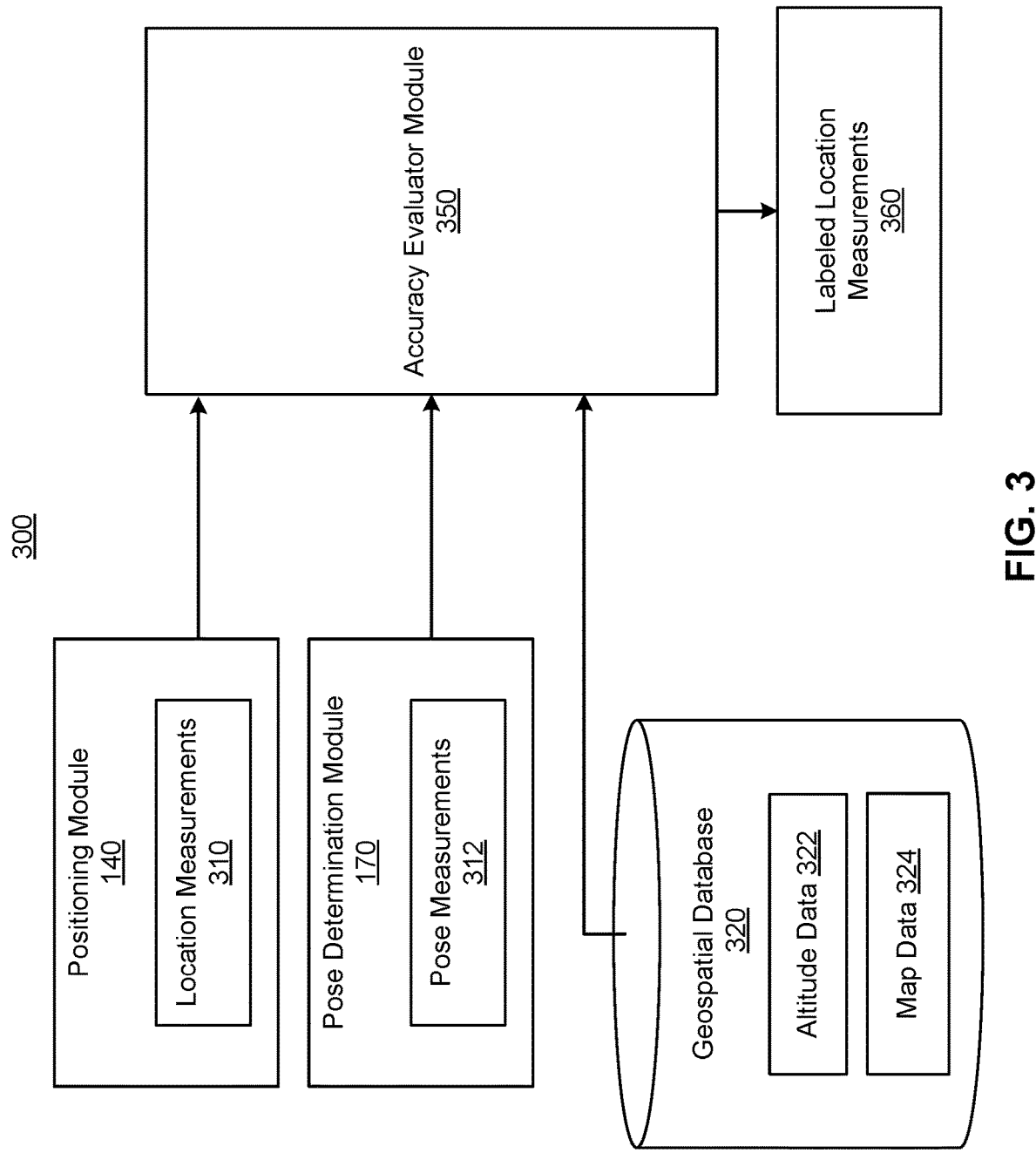
FIG. 3 illustrates a conceptual diagram illustrating an operation of the accuracy evaluator module, in accordance with some embodiments.

FIG. 3 is a conceptual diagram illustrating a data flow to the accuracy evaluator module to generate a set of labeled sensor location measurements, in accordance with some embodiments. As described above, the accuracy evaluator module 350 is configured to determine the accuracy of sensor location measurements based on corresponding VIO location measurements.

The accuracy evaluator module 350 receives a set of sensor location measurements 310 from the positioning module 140. These sensor location measurements indicate a location of the client device at a particular time stamp. For example, each sensor location measurement may be a global navigation satellite system (GNSS) measurement captured by a location sensor of the client device. Each sensor location measurement may include a longitude and latitude of the client device at a timestamp when the sensor location measurement was captured. In some embodiments, the sensor location measurements also include an altitude measurement. The accuracy evaluator module 350 receives a set of VIO location measurements 312 from the pose determination module 170 corresponding to the duration of time. As described in FIG. 1, the pose determination module 170 of the game server may use VIO data collected from the camera assembly and the sensor module of the client device 110 to estimate a pose of the client device 110. The VIO location measurements may further include an orientation of the client device as well as the client device's location.

The accuracy evaluator module 350 may also use geospatial data to determine the accuracy of sensor location measurements 310. In the embodiment illustrated by FIG. 3, the accuracy evaluator module 350 receives altitude data 322 and map data 324 from geospatial database 320. As described in FIG. 1, the geospatial databases 320 may contain geospatial data associated with physical features of the Earth's surface, the geospatial data including roads, buildings, bodies of water, etc. For example, the altitude data 322 may be obtained from a Digital Elevation Map (DEM) generated from LIDAR surveys. In another example, the map data may be obtained from an open-source online platform, such as Open Street Map (OSM).

The accuracy evaluator module 350 may generate a set of labeled sensor location measurements 360, which may include sensor location measurements labeled as accurate or inaccurate. The labeling process is further described below in FIG. 4.

Figure 4:
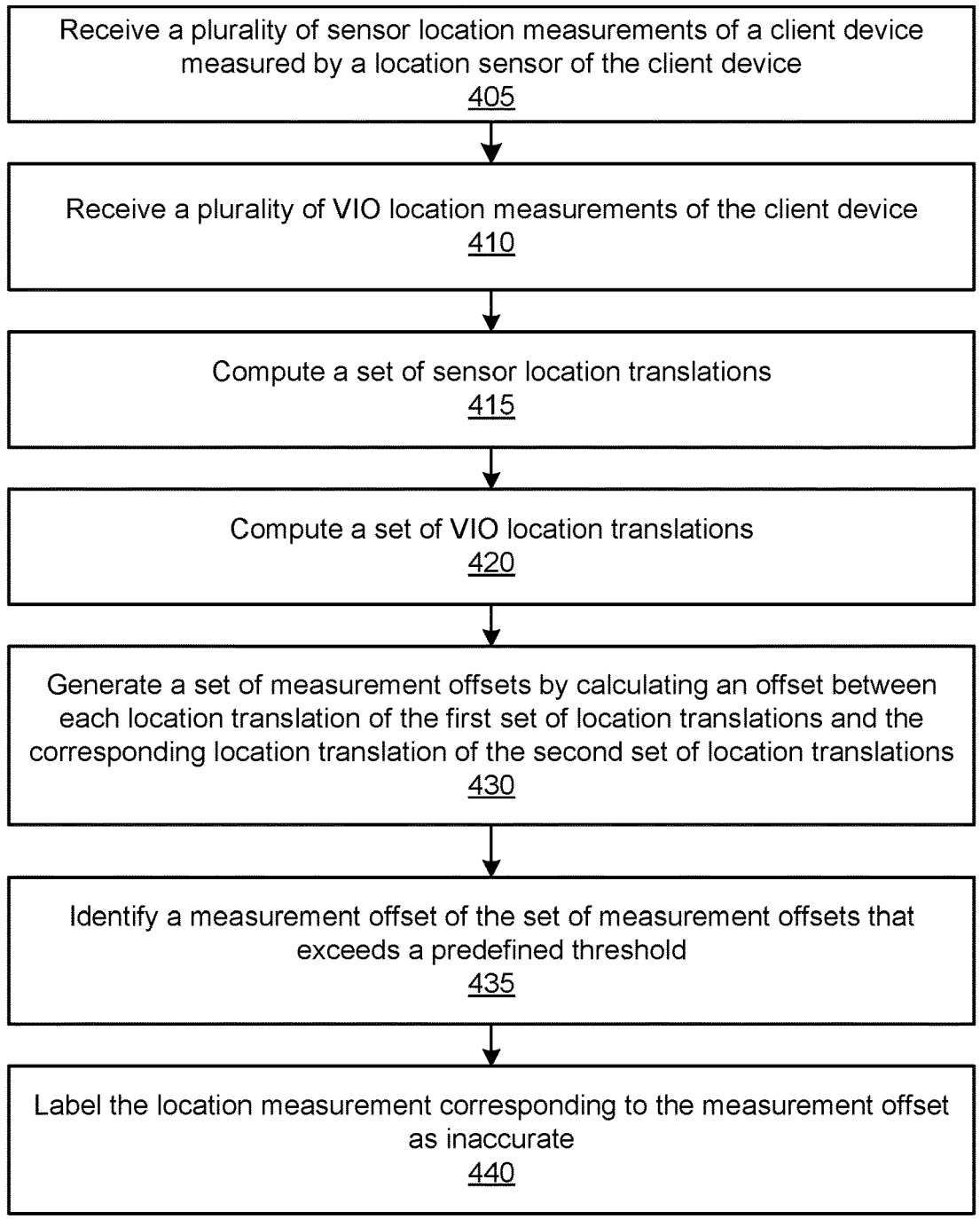
FIG. 4 is a flowchart illustrating a process for generating a set of classified sensor location measurements for use in a world pose optimization algorithm, in accordance with some embodiments.

FIG. 4 is a flowchart illustrating a process for generating a set of classified sensor location measurements for use in a world pose optimization algorithm, in accordance with some embodiments. In some embodiments, the process 400 may be performed by a computing device (e.g., game server 120), or may be a set of distributed computing devices that cooperate to execute a set of instructions (e.g., a virtual machine, a distributed computing system, cloud computing, etc.). The computing device that performs the process in FIG. 4 may include more than one computing device that is associated with the game server 120 or the client device 110.

The accuracy evaluator module receives 405 a plurality of sensor location measurements of a client device measured by a location sensor of the client device. Each sensor location measurement may include a latitude, longitude, or altitude measurement, and a timestamp corresponding to when the measurement was captured.

The accuracy evaluator module receives 410 a plurality of VIO location measurements of the client device. The pose determination module 170 may receive a plurality of VIO location measurements from the client device.

The accuracy evaluator module computes 415 a set of sensor location translations based on the received sensor location measurements. A sensor location translation represents a difference between a sequential pair of sensor location measurements. For example, a sensor location translation may be a vector that represents the change in the client device's location from one sensor location measurement to the next sensor location measurement. In embodiments where the sensor location measurements include pose data as well, the sensor location translations may reflect the changes in the client device's orientation as well.

The accuracy evaluator module computes the sensor location translations based on a sequential pair of sensor location measurements. The sequential pair of sensor location measurements are sensor location measurements that are captured sequentially in time. For example, if the client device captures sensor location translations periodically (i.e., based on a regular time period), the client device may identify consecutively captured sensor location measurements as sensor location measurements for a sequential pair. Alternatively, a sequential pair of sensor location measurements may be sensor location measurements that correspond to times near when corresponding VIO measurements were measured. For example, a sequential pair of sensor location measurements may be selected based on their timestamps such that the timestamps of the selected sensor location measurements are the closest to timestamps for a corresponding pair of VIO location measurements.

The accuracy evaluator module computes 420 a set of VIO location translations based on the VIO location measurements. Similar to the sensor location translations, a VIO location translation represents a difference between a sequential pair of VIO location measurements. The VIO location translation also may be vectors that represent the changes in the client device's location from one VIO location measurement to the next, and also may reflect a change in the device's orientation. The sequential pairs of VIO location measurements may be selected in a similar manner to how the sequential pairs of sensor location measurements are selected. For example, the sequential pairs may be selected as consecutive measurements captured by the client device or may be selected so that their timestamps match with timestamps of corresponding sensor location measurements.

The accuracy evaluator module identifies which sensor location translation corresponds to each VIO location translation and generates measurement difference based on the corresponding pairs of location translations. The accuracy evaluator module 350 may identify corresponding pairs of location translation based on timestamps of the corresponding sensor location measurements and VIO location measurements. For example, the accuracy evaluator module may identify, for each sensor location translation, the VIO location translation with timestamps that are closest to the timestamps of the sensor location translation (or vice versa). Alternatively, the accuracy evaluator module 350 may identify, for each sensor location translation, the VIO location translation that covers a time period that most overlaps with a time period for the sensor location translation (or vice versa).

The accuracy evaluator module generates 430 a measurement difference based on the corresponding pairs of the location translations. These measurement differences are the differences between the location translations, and thus represent the difference in the estimated path taken by the client device according to the sensor location measurements versus the VIO location measurements. These differences may be vectors that are the difference between vectors representing the sensor location translations and the VIO location translations.

The accuracy evaluator module compares the measurement differences to a threshold difference and labels each sensor location measurement as accurate or inaccurate based on whether its corresponding measurement difference exceeds the threshold difference. Thus, sensor location measurements with measurement differences that exceed the threshold may be labeled as inaccurate whereas the other sensor location measurements may be labeled as accurate. Thus, the accuracy evaluator module identifies 435 a measurement difference that exceeds the threshold and labels 440 the sensor location measurement corresponding to the identified measurement difference as inaccurate. In some embodiments, rather than labeling all of the sensor location measurements with accuracy labels, the accuracy evaluator module filters out inaccurate sensor location measurements and produces a filtered set of sensor location measurements that only include accurate sensor location measurements.

The game server may use accuracy labels for sensor location measurements to determine when the location sensor is temporarily ineffective. For example, if a threshold number of sensor location measurements are being labeled as inaccurate within a certain period of time, the game server may determine that the client device is located in an area where the location sensor is unable to accurately measure the client device's location (e.g., because the client device is near a large building that makes connecting with a satellite difficult for the location sensor). The game server may ignore sensor location measurements when determining the location of the client device for a period of time after the location sensor is determined to be inaccurate based on the accuracy labels. Similarly, the game server may notify a user of the client device that the location sensor is unable to generate accurate measurements or may disable functionality of a service provided by the game server until the sensor location measurements are determined to be sufficiently accurate again.

In some embodiments, other types of reference measurements such as altitude data may be used alone, or in combination with VIO location measurements, to determine the accuracy of sensor location measurements. For example, for a set of sensor location measurements, each having a latitude, longitude, and altitude measurement, the accuracy evaluator module 350 may access a geospatial database to retrieve altitude measurements corresponding to the latitude and longitude measurements of each of the sensor location measurements of the set of sensor location measurements. In some embodiments, the accuracy evaluation module may generate a set of measurement differences by calculating a difference between each altitude measurement of the sensor location measurements and the corresponding known altitude measurement obtained from the geospatial database. The accuracy evaluation module may identify a measurement difference of the set of measurement differences that exceeds a predefined threshold and may label the sensor location measurement corresponding to the measurement difference as inaccurate.

In some embodiments, the accuracy evaluator module calculates an accuracy score for each sensor location measurement. An accuracy score is a score reflecting a likelihood that a sensor location measurement is accurate. In an embodiment, the accuracy score may include an error estimate. The accuracy score may be used to determine a weight for the associated sensor location measurement, which determines the influence the sensor location measurement has on the resulting transform. For example, if a first sensor location measurement is assigned a higher error estimate as compared to a second sensor location measurement, the more accurate second sensor location measurement is assigned a higher weight and have a higher influence on the resulting transform.

Example Process for Identifying Inaccurate Satellite Signals

Figure 5:
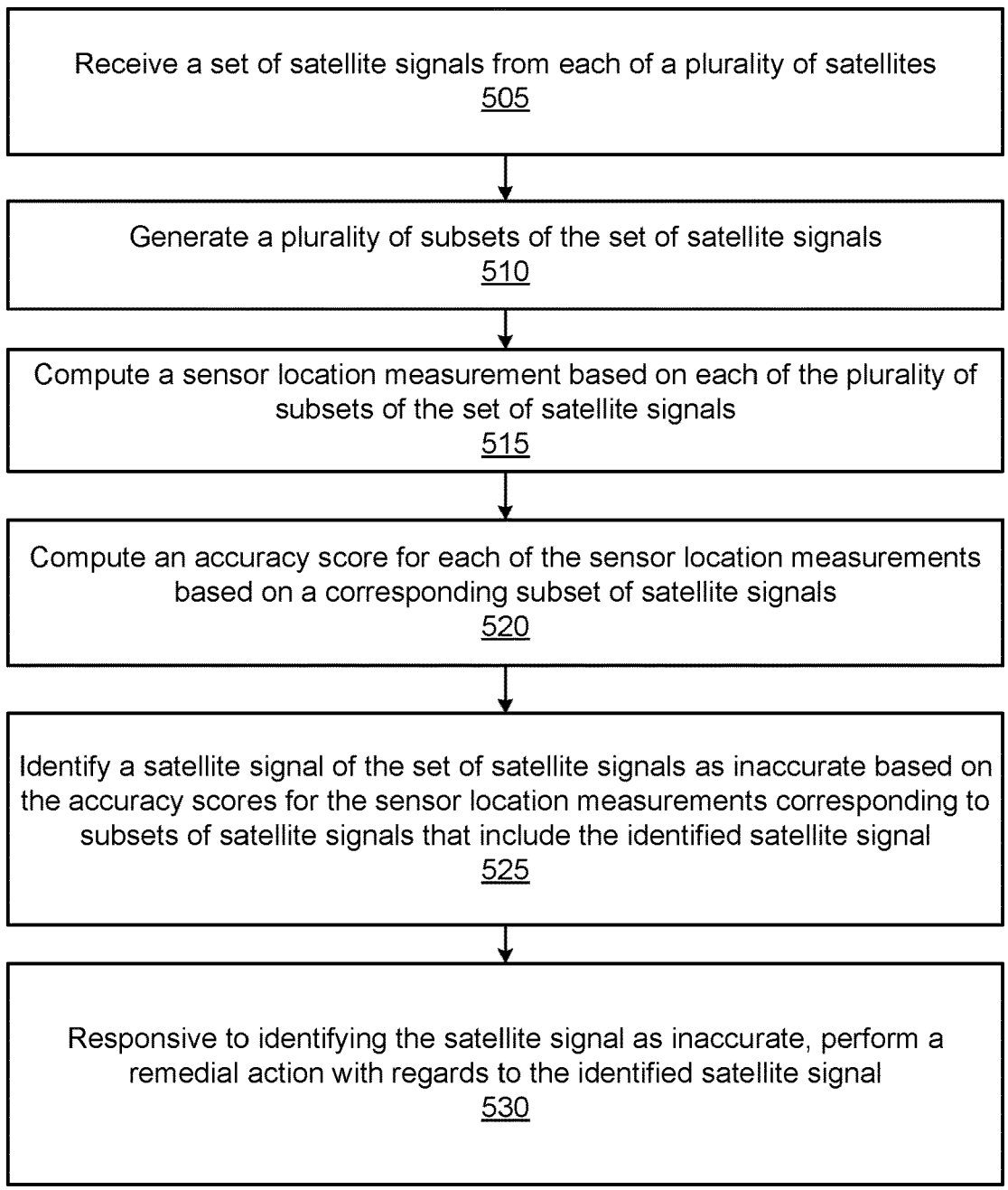
FIG. 5 is a flowchart illustrating a process for identifying an inaccurate satellite signal from a plurality of satellite signals, in accordance with some embodiments.

FIG. 5 is a flowchart illustrating a process for identifying an inaccurate satellite signal from a plurality of satellite signals, in accordance with some embodiments. In some embodiments, the client device is further configured to implement a combinatorial search method to identify an inaccurate satellite signal from a plurality of received satellite signals from satellites orbiting the Earth, in addition to generating a set of classified sensor location measurements. In some embodiments, the process 500 may be performed by a computing device (e.g., game server 120), or may be a set of distributed computing devices that cooperate to execute a set of instructions (e.g., a virtual machine, a distributed computing system, cloud computing, etc.). The computing device that performs the process in FIG. 5 may include more than one computing device that is associated with the game server 120 or the client device 110.

The client device receives 505 a set of satellite signals from each of a plurality of satellites. These satellite signals are signals that were transmitted by the plurality of satellites and captured by a location sensor of the client device. For example, the satellite signals may be signals from GNSS satellites. The satellite signals include information that enable the client device to generate sensor location measurements describing the client device's location. For example, the satellite signals may include a navigation message, which includes data such as satellite clock data, ephemeris data, satellite almanac data, etc. In some embodiments, the client device 110 receives the transmitted signals and decodes the transmitted signals to extract the necessary data to calculate the position of the client device 110. The client device 110 may determine its position at a particular timestamp by using a combination of signals from at least four satellites corresponding to the timestamp.

The client device generates 510 a plurality of subsets of the set of satellite signals. Each of these subsets excludes at least one of the received satellite signals. For example, if a client device receives a set of satellite signals from satellites A, B, C, D, and E, the client device may generate subsets which contain four of the five original satellite signals, such as {A, B, C, D}, {A, B, C, E}, {A, B, D, E}, {A, C, D, E}, and {B, C, D, E}. The client device may generate every possible subset of the set of signals or may apply some heuristics to limit the number of subsets that it generates.

The client device computes 515 a sensor location measurement based on each of the plurality of subsets of the set of satellite signals. As described in FIG. 1, the client device may use methods such as trilateration, multilateration, etc., to compute the sensor location measurement of the client device using the set of satellites signals. Each sensor location measurement may include a latitude, longitude, or altitude measurement corresponding to a time measurement.

The client device computes 520 an accuracy score for each of the sensor location measurements generated based on a corresponding subset of satellite signals. An accuracy score is a score reflecting a likelihood that a sensor location measurement is accurate. In some embodiments, the accuracy scores are accuracy labels and are computed as described with regards to FIG. 4. Alternatively, the client device may estimate an accuracy score for a sensor location measurement based on the satellite signals directly. For example, the client device may compare the satellite signals of a subset to historical data describing satellite signals captured by other client devices. This historical data may be labeled with whether the captured satellite signals included an inaccurate satellite signal. The client device may compare the satellite signals in each subset of satellite signals to the historical data to compute accuracy scores for each subset. In some embodiments, the client device uses a machine-learning model that is trained to predict accuracy scores for subsets of satellite signals based on labeled historical data.

In an embodiment, the client device uses a machine-learning model or geometric algorithm to model expected sensor location measurement behavior based on historical data, such as determining the spatial distribution of incorrect sensor location measurements. For example, it may be observed that a sensor location measurement of a client device at a particular location is often positioned inaccurately (e.g., in the middle of a road) due to reflections from surrounding buildings. As a result, a subset of satellite signals which results in a sensor location measurement in an inaccurate position can be identified because of an inaccurate satellite measurement.

In another instance, the client device may use ephemeris data to identify correlations between error rates of sensor location measurements and the positions of satellites. For example, it may be observed that at a particular location, satellite signals from satellites positioned East of a client device exhibit lower reliability compared to satellites positioned in other directions relative to the client device. Accordingly, the client device may exclude satellite signals received from the satellites positioned East of the client device when determining the client device's location.

The client device identifies 525 a satellite signal of the set of satellite signals as inaccurate based on the accuracy scores for the sensor location measurements corresponding to subsets of satellite signals that include the identified satellite signal. The client device may identify the inaccurate satellite signal by identifying which of the subsets of satellite signals is accurate and identifying which of the satellite signals was excluded from the identified subset. For example, the client device may identify the sensor location measurement associated with subset {A, C, D, E} as accurate and the rest of the subsets as inaccurate. The client device may identify satellite signal B as being common to the inaccurate subsets, and thereby determine that signal B is an inaccurate satellite signal. The client device may then use a subset of satellite signals without the inaccurate satellite signal to determine the client device's location.

If the client device identifies a satellite signal as inaccurate, the client device may also perform 530 a remedial action with regards to the identified satellite signal. For example, the client device may disregard future satellite signals from the satellite that generated the satellite signal for a certain time period. That is, for some time period after determining that the satellite signal is inaccurate, the client device may filter out signals from the satellite from those signals used to determine the client device's location. Similarly, the client device may disregard future satellite signals from that satellite until the client device has moved a threshold distance away from the client device's location or to a substantially different location, such that whatever was causing the inaccuracy in signals from that satellite is no longer an issue. In some embodiments, the client device uses other sources of information for its location to localize itself. For example, the client device may start using VIO data or IMU sensor data to determine its location.

Example Computing System

Figure 6:
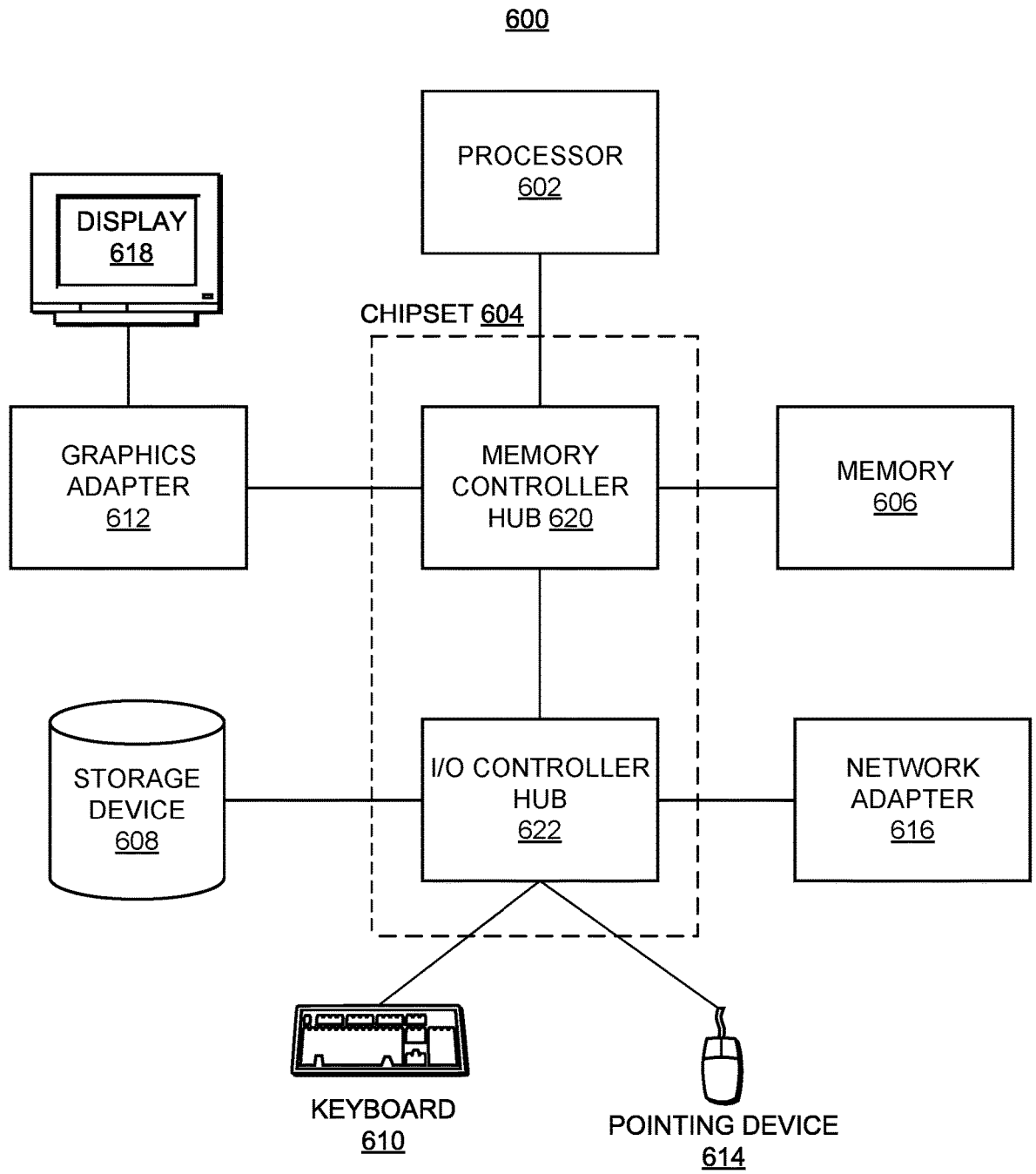
FIG. 6 is an example architecture of a computing device, in accordance with some embodiments.

FIG. 6 is an example architecture of a computing device, in accordance with some embodiments. Although FIG. 6 depicts a high-level block diagram illustrating physical components of a computer used as part or all of one or more entities described herein, in accordance with an embodiment, a computer may have additional, less, or variations of the components provided in FIG. 6. Although FIG. 6 depicts a computer 600, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 6 are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604. In some embodiments, the computer 600 includes one or more communication buses for interconnecting these components. The one or more communication buses optionally include circuitry (sometimes called a chipset) that interconnects and controls communications between system components.

The storage device 608 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 608 can also be referred to as persistent memory. The pointing device 614 may be a mouse, track ball, or other type of pointing device, and is used in combination with the keyboard 610 to input data into the computer 600. The graphics adapter 612 displays images and other information on the display 618. The network adapter 616 couples the computer 600 to a local or wide area network.

The memory 606 holds instructions and data used by the processor 602. The memory 606 can be non-persistent memory, examples of which include high-speed random-access memory, such as DRAM, SRAM, DDR RAM, ROM, EEPROM, flash memory.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a plurality of sensor location measurements of a client device measured by a location sensor of the client device, wherein each sensor location measurement comprises a geographic location of the client device measured by the location sensor;
   receiving a plurality of visual inertial odometry (VIO) location measurements of the client device, wherein each VIO location measurement is determined based on VIO data captured by the client device;
   computing a plurality of sensor location translations based on the plurality of sensor location measurements, wherein each sensor location translation is a difference between a sequential pair of sensor location measurements of the plurality of sensor location measurements;
   computing a plurality of VIO location translations based on the plurality of VIO location measurements, wherein each VIO location translation is a difference between a sequential pair of VIO location measurements of the plurality of VIO location measurements;
   computing a difference between each sensor location translation of the plurality of sensor location translations and a corresponding VIO location translation of the plurality of VIO location translations;
   determining that a difference between a sensor location translation and a VIO location translation exceeds a threshold;
   responsive to the determination, labeling the sensor location measurement corresponding to the difference as inaccurate; and
   responsive to labeling the sensor location measurement as inaccurate, disabling a feature of a client application operating on the client device.

2. The method of claim 1, wherein the plurality of sensor location measurements comprise measurements captured by a global navigation satellite system (GNSS) sensor of the client device.

3. The method of claim 1, wherein the VIO data comprises visual data and sensor data captured by the client device.

4. The method of claim 1, wherein each of the plurality of sensor location measurements comprises an altitude component, and wherein the method further comprises:
   for each of the sensor location measurements:
      receiving an altitude value from a third-party database, wherein the altitude value corresponds to the geographic location of the sensor location measurement;
      computing a difference between the received altitude value and the altitude component of the sensor location measurement; and
      responsive to the difference exceeding a threshold value, labeling the sensor location measurement as inaccurate.

5. The method of claim 1, wherein each of the plurality of sensor location translations comprises a vector between the corresponding pair of sensor location measurements.

6. The method of claim 1, further comprising:
   responsive to labeling the sensor location measurement as inaccurate, notifying a user of the client device that a sensor location measurement measured by the location sensor is inaccurate.

7. The method of claim 1, wherein computing the difference between the sensor location translation and the corresponding VIO location translation comprises:
   identifying a corresponding VIO location translation for each sensor location translation of the plurality of sensor location translations based on timestamps of the corresponding sensor location measurements and the corresponding VIO location measurements.

8. A non-transitory computer-readable storage medium comprising stored instructions executable by a processor, the stored instructions executable to perform operations comprising:
   receiving a plurality of sensor location measurements of a client device measured by a location sensor of the client device, wherein each sensor location measurement comprises a geographic location of the client device measured by the location sensor;
   receiving a plurality of visual inertial odometry (VIO) location measurements of the client device, wherein each VIO location measurement is determined based on VIO data captured by the client device;

computing a plurality of sensor location translations based on the plurality of sensor location measurements, wherein each sensor location translation is a difference between a sequential pair of sensor location measurements of the plurality of sensor location measurements;

computing a plurality of VIO location translations based on the plurality of VIO location measurements, wherein each VIO location translation is a difference between a sequential pair of VIO location measurements of the plurality of VIO location measurements;

computing a difference between each sensor location translation of the plurality of sensor location translations and a corresponding VIO location translation of the plurality of VIO location translations;

determining that a difference between a sensor location translation and a VIO location translation exceeds a threshold;

responsive to the determination, labeling the sensor location measurement corresponding to the difference as inaccurate; and responsive to labeling the sensor location measurement as inaccurate, disabling a feature of a client application operating on the client device.

9. The non-transitory computer-readable storage medium of claim 8, wherein the plurality of sensor location measurements comprise measurements captured by a GNSS sensor of the client device.

10. The non-transitory computer-readable storage medium of claim 8, wherein the VIO data comprises visual data and sensor data captured by the client device.

11. The non-transitory computer-readable storage medium of claim 8, wherein each of the plurality of sensor location measurements comprises an altitude component, and wherein the operations further comprise:

for each of the sensor location measurements:
   receive an altitude value from a third-party database, wherein the altitude value corresponds to the geographic location of the sensor location measurement;
   compute a difference between the received altitude value and the altitude component of the sensor location measurement; and
   responsive to the difference exceeding a threshold value, labeling the sensor location measurement as inaccurate.

12. The non-transitory computer-readable storage medium of claim 8,
   wherein each of the plurality of sensor location translations comprises a vector between the corresponding pair of sensor location measurements.

13. The non-transitory computer-readable storage medium of claim 8, the operations further comprising:
   responsive to labeling the sensor location measurement as inaccurate, notify a user of the client device that a sensor location measurement measured by the location sensor is inaccurate.

14. The non-transitory computer-readable storage medium of claim 8, wherein computing the difference between the sensor location translation and the corresponding VIO location translation comprises:
   identifying a corresponding VIO location translation for each sensor location translation of the plurality of sensor location translations based on timestamps of the corresponding sensor location measurements and the corresponding VIO location measurements.

15. A computer system comprising:
at least one processor; and
a non-transitory computer-readable storage medium comprising stored instructions executable by a processor, the stored instructions executable to perform operations comprising:
   receive a plurality of sensor location measurements of a client device measured by a location sensor of the client device, wherein each sensor location measurement comprises a geographic location of the client device measured by the location sensor;
   receive a plurality of visual inertial odometry (VIO) location measurements of the client device, wherein each VIO location measurement is determined based on VIO data captured by the client device;
   compute a plurality of sensor location translations based on the plurality of sensor location measurements, wherein each sensor location translation is a difference between a sequential pair of sensor location measurements of the plurality of sensor location measurements;
   compute a plurality of VIO location translations based on the plurality of VIO location measurements, wherein each VIO location translation is a difference between a sequential pair of VIO location measurements of the plurality of VIO location measurements;
   compute a difference between each sensor location translation of the plurality of sensor location translations and a corresponding VIO location translation of the plurality of VIO location translations;
   determine that a difference between a sensor location translation and a VIO location translation exceeds a threshold;
   responsive to the determination, label the sensor location measurement corresponding to the difference as inaccurate; and
   responsive to labeling the sensor location measurement as inaccurate, disable a feature of a client application operating on the client device.

16. The computer system of claim 15, wherein the plurality of sensor location measurements comprise measurements captured by a global navigation satellite system (GNSS) sensor of the client device.

17. The computer system of claim 15, wherein the VIO data comprises visual data and sensor data captured by the client device.

18. The computer system of claim 15, wherein each of the plurality of sensor location measurements comprises an altitude component, and wherein the operations further comprise:
   for each of the sensor location measurements:
      receive an altitude value from a third-party database, wherein the altitude value corresponds to the geographic location of the sensor location measurement;
      compute a difference between the received altitude value and the altitude component of the sensor location measurement; and
      responsive to the difference exceeding a threshold value, labeling the sensor location measurement as inaccurate.

\* \* \* \* \*